(12) United States Patent
Benson

(10) Patent No.: US 6,334,118 B1
(45) Date of Patent: Dec. 25, 2001

(54) SOFTWARE RENTAL SYSTEM AND METHOD FOR RENTING SOFTWARE

(75) Inventor: Glenn Benson, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/046,225

(22) Filed: Mar. 23, 1998

(30) Foreign Application Priority Data

Jul. 31, 1997 (EP) .................................... 97113262

(51) Int. Cl.$^7$ .................................... G06F 17/60

(52) U.S. Cl. ........................ 705/52; 705/51; 713/167; 713/176

(58) Field of Search ........................ 705/52, 32, 55, 705/56, 77, 50–51, 57; 380/4, 21, 23, 25, 30, 49, 50, 286, 46; 713/176, 167, 187, 186, 200, 201, 100.2; 707/10; 709/224, 229

(56) References Cited

U.S. PATENT DOCUMENTS

| | | | |
|---|---|---|---|
| 4,232,370 | * 11/1980 | Tapley | 700/214 |
| 4,652,990 | * 3/1987 | Pailen | 705/56 |
| 5,023,907 | * 6/1991 | Johnson et al. | 710/200 |
| 5,388,211 | * 2/1995 | Hornbuckle | 705/32 |
| 5,649,187 | * 7/1997 | Hornbuckle | 707/10 |
| 5,678,046 | * 10/1997 | Cahill et al. | 705/30 |
| 5,724,425 | * 3/1998 | Chang et al. | 705/52 |
| 5,828,751 | * 10/1998 | Walker et al. | 713/175 |
| 5,923,763 | * 7/1999 | Walker et al. | 380/51 |
| 5,943,423 | * 8/1999 | Muftic | 705/67 |
| 5,960,085 | * 9/1999 | De La Huerga | 380/25 |
| 5,970,143 | * 10/1999 | Schneier et al. | 380/23 |
| 5,978,475 | * 11/1999 | Schneir et al. | 705/52 |

FOREIGN PATENT DOCUMENTS

| | | | |
|---|---|---|---|
| 0325777A2 | * 12/1988 | (EP) | G06F/11/30 |
| 0 325 777 | 8/1989 | (EP) . | |
| WO 8805941 | 8/1988 | (WO) . | |
| WO 88/05941 | * 8/1988 | (WO) | G06F/1/00 |
| WO 95/17732 | * 6/1995 | (WO) | G06F/17/60 |

OTHER PUBLICATIONS

"Add–on bid to foil pirates (Gamester has come up with what it considers a foolproof solution to allow software companies to make revenue from rental without running the risk of their products being pirated or their sales of CD–ROMs being cannibalised)" f.*

"Circuit City venture creates new DVIX pay–per–view rival to digital video disk" from Computergram International, n3252, ISSN: 0268–716X.*

Salvador, "LINQing classrooms to the Net", Electronic Learning (GELL), v14, n5, p6.*

Swenson, "Software stores up & running (resellers rush to establish electronic stores to sell software)(includes realated article on purchasing software online)" from Information-Week, n584, p83(3).*

Schneier, "Data guardians: How strong are the locks on 24 security products?" from Macworld ISSN: 0741–8647, v10 n2 p144(8), http://www.macworld.com.*

(List continued on next page.)

Primary Examiner—Cuong H. Nguyen
(74) Attorney, Agent, or Firm—Schiff Hardin & Waite

(57) ABSTRACT

A software rental system and method are provided having at least one rented program permitting at least one service to a customer with a customer's response means. The rented program has no access to a customer's private keying material. Using asymmetric cryptography, the customer's response means proves to the rented program that the customer's response means has access to the customer's private keying material. The rented program does not permit the at least one service to the customer unless the proof is successful.

4 Claims, 4 Drawing Sheets

OTHER PUBLICATIONS

Schneier, "Data guardians: How strong are the locks on 24 security products?" from Macworld ISSN: 0741–8647, v10 n2 p144(8), http://www.macworld.com, Mar. 1997.*

Menezes et al., Handbook of Applied Cryptography, CRC Press, Inc., pp. 405–424.

Rivest, The MD5 Message–Digest Algorithm, RFC 1321, Apr. 1992, pp. 1–18.

Davis et al., Cryptographic Randomness from Air Turbulence in Disk Drives, pp. 114–120.

The Art of Computer Programming, vol. 2, Seminumerical Algorithms, Addison–Wesley Publishing Co., Reading MA, $2^{nd}$ Edition, 1981, pp. 38–73.

* cited by examiner

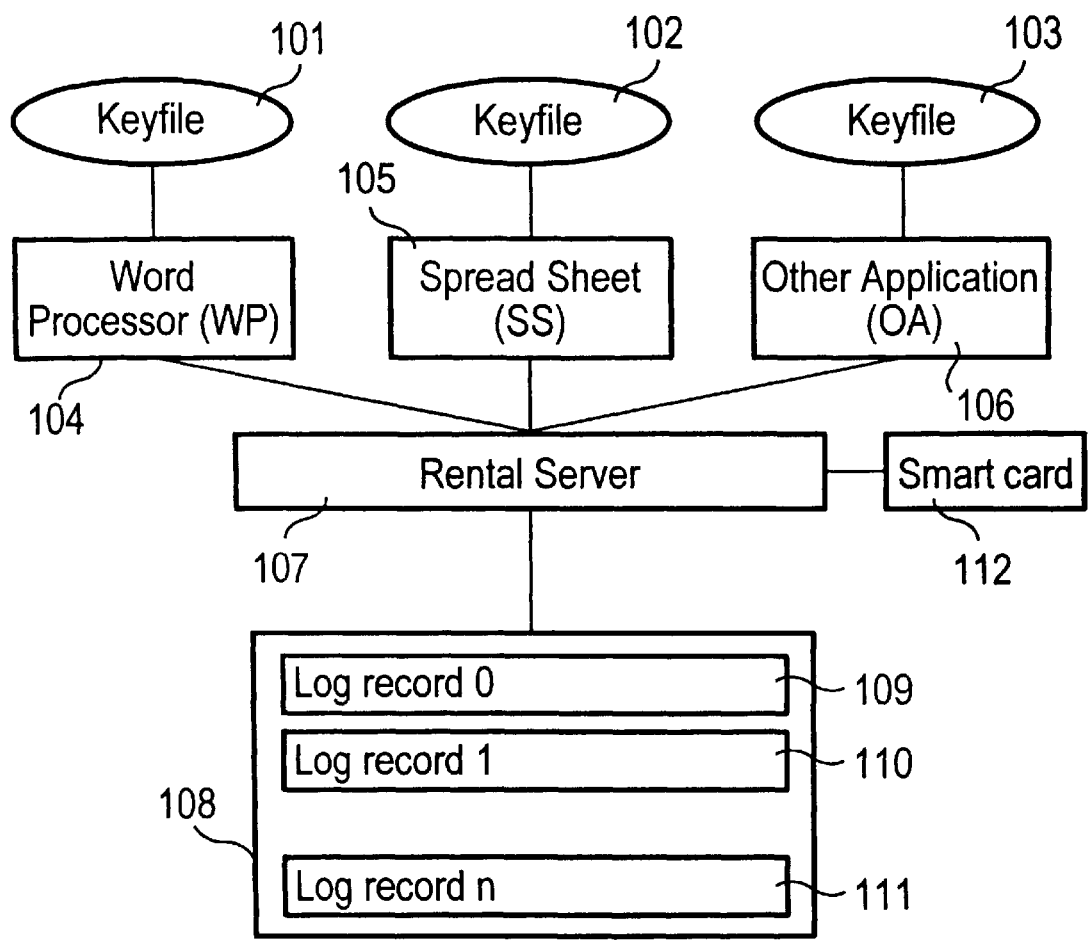
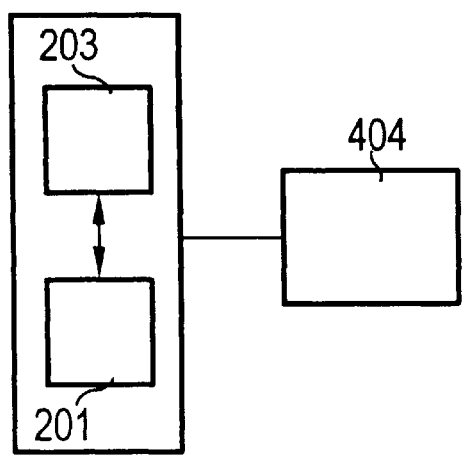

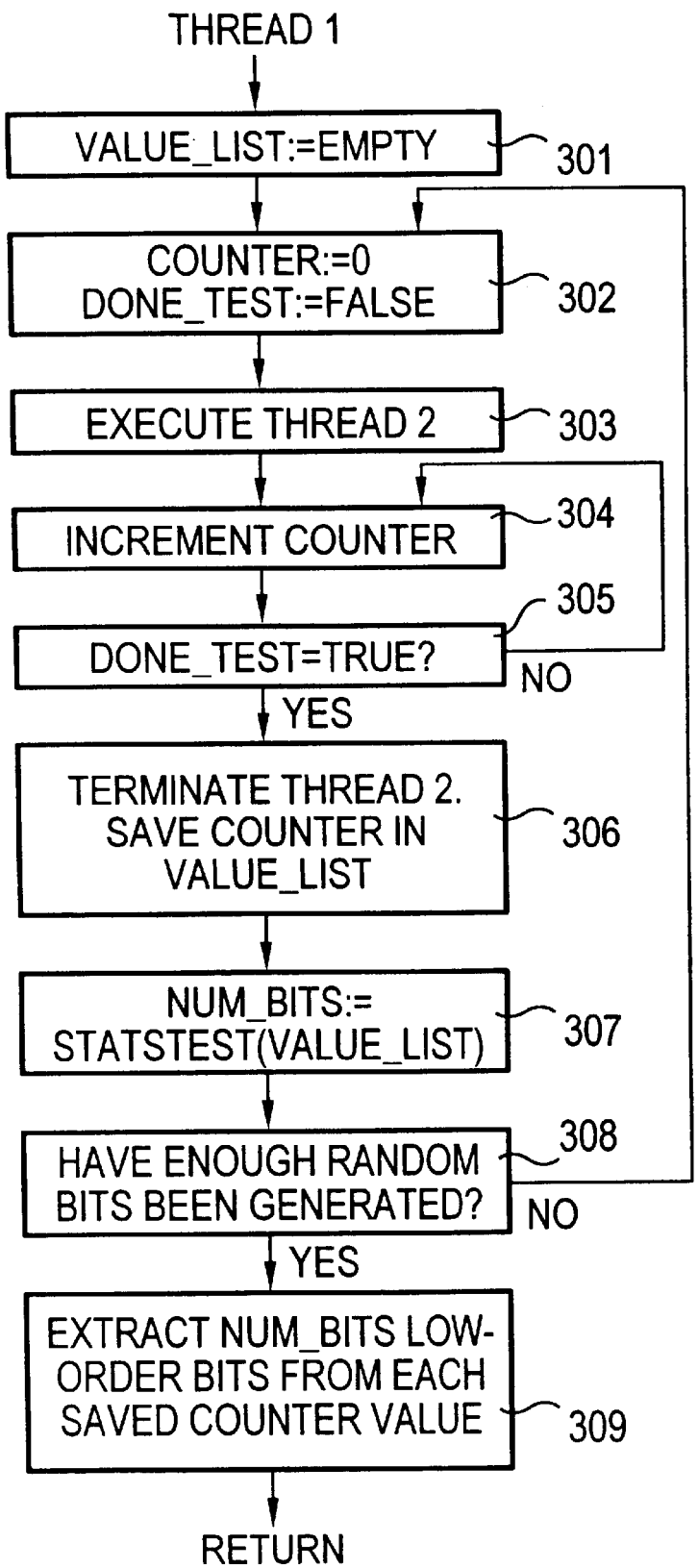

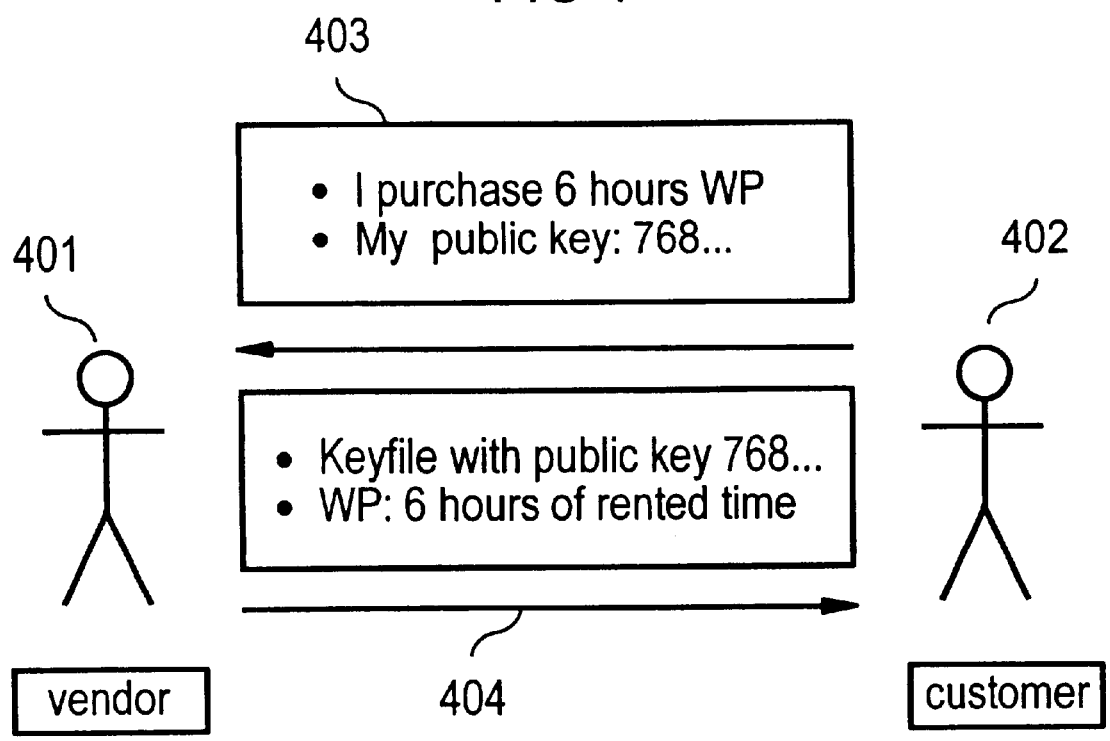
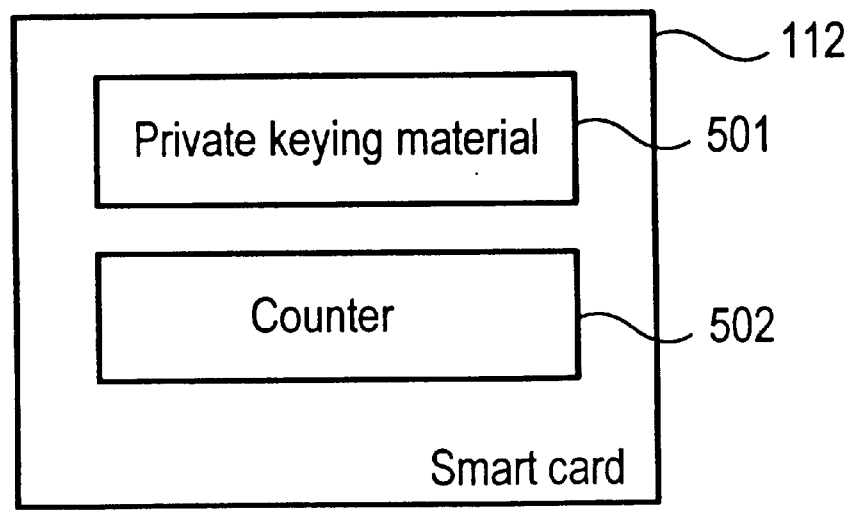

FIG 6

| | | |
|---|---|---|
| 96 | WP, 15 minutes public key 982... | 0 | Signature of hash (hash (96, WP...),0) |
| 108 | SS, execution public key 982... | 1 | Signature of hash (hash (108, WP...),1) |
| 42 | WP, 15 minutes public key 982... | 2 | Signature of hash (hash (42, WP...),2) |
| 70328 | WP, 15 minutes public key 982... | 3 | Signature of hash (hash (70328, WP...),3) |

SOFTWARE RENTAL SYSTEM AND METHOD FOR RENTING SOFTWARE

BACKGROUND OF THE INVENTION

The present invention generally relates to a rental system and method. More specifically, the present invention relates to a software rental system and method for renting software.

With few exceptions, most computer programs are instantiations of intellectual property and execute upon demand after installation. Normally, one can build and install an inexpensive copy of a computer program by little more than simply executing a copy command. A physical asset such as an automobile, on the other hand, cannot be easily copied. As a result, it is much easier to provide rental of physical assets than rental of computer programs. In the case of a physical asset, the renter first pays a rental fee, and then physically takes possession of the asset. At the conclusion of the rental period, the renter returns the physical asset to the owner. In the case of software, on the other hand, it makes little sense for the customer to return the program to the owner because one cannot guarantee that the customer refrained from sequestering his or her own backup copy. In the absence of adequate security measures, a customer acting in the role of an attacker could potentially rent the software for a short period of time and, subsequently, use the sequestered backup without paying further rental fees.

In the present invention, software rental as a computer system and method that securely stores rental (usage) records are defined. For example, consider the time-of-use rental metric. If the customer executes the rented software for one hour on the first day and for two hours on the second day, then, the secured audit trails show one hour at the end of the first day and three hours at the end of the second day. Secure software implies that a customer cannot defeat system security by purging, replacing, or modifying audit trails. Normally, the software continually monitors the audit trails to determine when a threshold is exceeded. So, if the example software has a five hour threshold, then the customer may execute the software for two more hours and then the software stops. Another example threshold is the total amount of times that the software may execute.

Some rental mechanisms that have all the properties listed above currently exist, e.g. Dongles (See Hardlock API, *Manual Implementation of Hardlock Software Protecting Systems, High-Level API* Version 3 Application Programming Interface, FAST Software Security-Group, FAST Document: High-Level API, Revision 4.00e, Mar. 1, 1996). Dongles have non-volatile memory which may be protected by passwords. This password protected memory may potentially be used for software rental. A characteristic of this rental mechanism is that it requires the assistance of a secured rental device, e.g. a Dongle. The secured rental device contains Secured Updateable Storage Locations SUSLs) that record information related to usage of the rented software. Each SUSL has the property that the SUSL resides on a secured device and provides protection against attack. Normally, at least one SUSL for each unit of rented software is required. For example, if a customer rents a word processor, a spread sheet, and a game, then the rental device(s) must provide at least three SUSLs. These SUSLs are relatively expensive and difficult to administer when compared to other storage on the customer's machine, e.g. memory or disk space.

Software rental, furthermore, significantly differs from a subscription to a network service. For example, suppose a software vendor provides a server to which customers connect via their software clients. During the period of the connection, the server audits usage records, e.g. connect time. The vendor assesses charges based upon the information recorded in the server's audit trail. This client-server example differs from the present invention because the present invention does not necessarily require an on-line presence by the software vendor. Rather, after obtaining permission to use the rented software, the customer executes the software without any required network connections. Furthermore, the subscription service does not prevent the customer from caching frequently used items.

An overview on asymmetric cryptography, for example, on the RSA scheme, and probabilistic encryption, for example, the Blum-Goldwasser probabilistic public-key encryption scheme can be found in A. Menezes et al., *Handbook of Applied Cryptography*, CRC Press, Inc. 1997, pp. 22–23, 224–233, 250–259, 308–311, 405–424, 433–438, 572–577.

An overview of different probabilistic proof schemes, for example, zero-knowledge proof schemes (e.g. Feige-Fiat-Shamir scheme; Guillou-Quisquater scheme; Blum-Feldmann-Micali scheme; Brassard scheme; Crepau scheme; etc.) or witness hiding proof schemes (e.g. Feige-Shamir scheme etc.) can be found in Menezes et al. supra.

An overview of digital signature schemes (e.g. Rivest-Shamir-Adelman, etc.) and a formal mathematical definition of digital signatures can also be found in Menezes et al. supra.

An example of a message digest function (otherwise known as a one-way hash function) is MD5 and is described in R. Rivest, *The MD5 Message-Digest Algorithm*, RFC 1321, April 1992. It is computationally infeasible or very difficult to compute the inverse of a message digest.

In P. Fenstermacher et al., "Cryptographic Randomness from Air Turbulence in Disk Drives," *Advances in Cryptology: Crypto '94*, 1994 Springer Verlag, pp. 114–120, cryptographic randomness from air turbulence in disk drives is described.

The Chi-Square Test, the Kolmogorov-Smirnov Test, and the Serial Correlation Test are described in D. Knuth, *The Art of Computer Programming*, Vol. 2, Seminumerical Algorithms, Addison-Wesley Publishing Co., $2_2$nd Edition, 1981, pp. 38–73.

An asymmetric cryptographic mechanism includes public keying material and corresponding private keying material. It is computationally infeasible to compute the private keying material when given no more information than the corresponding public keying material. In the present invention, asymmetric cryptography is used in interactions between two parties, A and B. A proves to B that A has access to private keying material and B validates the proof. A does not disclose the private keying material to B.

A digital signature is an electronic analog of a handwritten signature. A digital signature proof involves at least two parties, A and B. After posting his or her public keying material to a public location, A encrypts a message using the private keying material. Since anyone may access the public keying material, there is no message secrecy. However, since A is the only customer with access to the private keying material, no one else can "forge A's signature" by performing the encryption. Anyone may validate A's signature using the public keying material—simply decrypt using A's public keying material.

An asymmetric confidentiality proof involves at least two parties, A and B. A possesses private keying material, and B has no access to A's private keying material unless B discloses the private keying material itself (which B should not do). At the beginning, A and B have no shared secret. During the method, a shared secret becomes known to A and B.

In all asymmetric cryptographic schemes, each customer may post his or her public keying material to a publicly accessed directory without compromising the corresponding private keying material. The customer usually should guard his or her private keying material as a close secret; otherwise, the cryptographic system may not guarantee correctness (secrecy). The best known mechanism for protecting one's private keying material is through the use of a smart card. In this case, the smart card is a device with no interface for releasing private keying material (in a non-cryptographically protected form). All cryptographic operations that directly reference the private keying material are performed on the smart card itself. As a result, no one can discover the contents of the private keying material stored on a smart card.

Although smart cards provide the best protection, social factors of electronic commerce may provide a role in ensuring private keying material protection. One of the significant difficulties associated with asymmetric encryption services is authentication. For example, if A posts his or her public keying material to a public directory, then how does B assess validity? That is, a pirate may attempt to masquerade as A but post the pirate's keying material. Some commercial organizations provide solutions to this problem by acting as Certification Authorities (CA). For, often times, a fee, the CA solicits identifying material from potential customers, such as a driver's license or passport. After validating the identifying material, the CA posts the customer's public keying material to a public directory, and the CA signs a certificate(using a digital signature with the CA's private key) that holds the customer's public keying material. Standardized services, for example, X.500, may be adopted to help facilitate the use of directories that contain public keying material.

Once a customer posts his or her public keying material to the CA, the customer will probably make an extensive effort to protect his or her private keying material. For some asymmetric keys, if the customer's private keying material were to become unknowingly compromised, then the customer would have cause for significant concern. For example, in the case of RSA keys that can also be used for digital signatures, networked vendors could potentially authorize electronic commerce transactions.

The present invention provides a system and method to create a cryptographically secure software rental system and overcomes the deficiencies of other known systems and methods.

SUMMARY OF THE INVENTION

According to the present invention, a software rental system is provided having at least one rented program permitting at least one service to a customer with a customer's response means.

The rented program has no access to a customer's private keying material. Using asymmetric cryptography, the customer's response means proves to the rented program that the customer's response means has access to the customer's private keying material. The rented program does not permit the at least one service to the customer unless the proof is successful.

According to a further aspect of the invention, a software rental system is provided having at least one rented program and private keying material such that the software rental system securely stores audit trails wherein the correctness of the audit trails is validated using asymmetric cryptography.

According to a further aspect of the invention, a method is provided of distributing a program to a plurality of customers wherein each customer has a software rental system as described above and further wherein every customer receives an identical copy of said program.

According to a further aspect of the invention, a method is provided for renting software having at least one rented program permitting at least one service to a customer with a customer's response means wherein the rented program has no access to a customer's private keying material. Using asymmetric cryptography, the customer's response means proves to the rented program that the customer's response means has access to the customer's private keying material. The rented program does not permit the at least one service to the customer unless the proof is successful.

According to a further aspect of the invention, a method is provided for renting software having at least one rented program and private keying material such that the software rental system securely stores audit trails wherein the correctness of the audit trails is validated using asymmetric cryptography.

A new mechanism is, therefore, provided in which the number of required SUSLs is not a function of the number of rented programs. In particular, the present invention requires only a single SUSL regardless of the number of rented programs or whether or not these programs simultaneously execute. For example, a customer could potentially simultaneously execute 100 or more rented programs while using only a single SUSL. The SUSL requires no more than 128-bits in order to protect an unlimited number of rented programs. In some cases, a single 32-bit SUSL or a single 64-bit SUSL may be sufficient. As will be described later, the SUSL is used to denote a single non-negative integer. This integer is used as a counter that begins at an initial value (normally zero) and ends at the highest value that can be represented by the counter. Under normal circumstances, it is not possible to count through all of the possible numbers that can be represented by a 128-bit counter. Even if one were to build a machine that could increment the counter trillions of times each second (one would not normally want to count this fast), then it would take millions of years to reach the maximum value of the counter ($2^{128}-1$).

The present invention also provides a method for distributing rented software. In this method, a customer may rent new applications from any vendor whenever he or she wishes. The customer does not need to install new external rental devices or new SUSLs.

The main motivation from the perspective of security for requiring at least one SUSL is to protect against the backup and restore attack as described below. Suppose that a rented application requires no SUSL. An attacker may break security by performing the following steps. First, the attacker in the role of an authorized rental customer legitimately rents a program. Next, the attacker builds a full system backup of all of the non-volatile memory on the attacker's machine. Next, the attacker executes the rented program. Next, the attacker shuts down and re-boots his or her machine. Finally, the attacker restores the state of the non-volatile memory to the original state at the time of the backup. At this point, the attacker has destroyed any possible record that the program was previously rented. An SUSL, on the other hand, counters this attack because an SUSL has the property that the information contained in the SUSL cannot be modified in an unauthorized manner. As a result, the attacker's restore operation cannot overwrite the SUSL with the purpose of defeating security.

A customer may, however, delete all copies of the software at the conclusion of the rental period so an alternate approach is provided. Namely, the software is locked so that the customer cannot execute the software without first providing an appropriate key. At the end of the rental period, the customer is prohibited from subsequently using this key or any copy of the key. Therefore, at the conclusion of the rental period, the customer can no longer use the software because the customer will no longer be able to provide an appropriate key.

In a further aspect of the invention, there are multiple rented programs wherein the rented programs access the same public keying material, and the customer's private keying material is stored on a smart card.

To further improve the security, it is an advantage of the present invention that at least one usage parameter of the at least one program is stored in an audit trail, and the rented program does not permit the at least one service to the customer unless the at least one usage parameter is within a predetermined threshold.

In a further aspect of the invention, the at least one usage parameter is a rental time period for renting the at least one program.

In a further aspect of the invention, the at least one usage parameter is an amount of usage of the at least one program.

To further improve the security, it is an advantage of the present invention that the at least one usage parameter is checked multiple times, and the rented program does not permit the at least one service to the customer unless the at least one usage parameter is in a predetermined interval each time it is checked.

To further improve the security, it is an advantage of the present invention that there is provided a rental server that synchronizes access to a smart card on which a customer's private keying material is stored and/or to an audit trail in which usage parameters of the at least one program are stored. Thus, there is a central instance which is responsible for much of the software rental, but not necessarily security.

In a further aspect of the invention, the program stores the at least one usage parameter in the audit trail.

In a further aspect of the invention, aspects of the audit trial are stored securely.

In a further aspect of the invention, portions of the audit trail are stored on a medium that is not secure. This makes the system easier and less expensive to be realized without sacrificing security. However, aspects of the audit trail are stored in an SUSL wherein the SUSL stores a single counter value.

To further improve the security, it is an advantage of the present invention that the smart card performs an automatic routine that both executes a digital signature and an operation computed over an SUSL of the smart card wherein the value held in the storage location changes over time.

To further improve the security, it is an advantage of the present invention that the system includes a key file for holding public keying material.

To further improve the security, it is an advantage of the present invention that the public keying material held in the key file is cryptographically secured whereby it is computationally not feasible to alter any portion of the key file including the first public keying material without altering the challenge means to be defined later.

To further improve the security, it is an advantage of the present invention that the key file includes information identifying the customer to whom the program has been supplied.

To further improve the security, it is an advantage of the present invention that the key file includes decoy bits for disguising the public keying material held therein.

To further improve the flexibility, it may be possible to use software rental without defining a threshold. In this case, the software may be rented without limit. However, the customer is trusted to periodically send his or her audit trails to the vendor and submit an associated payment.

Additional features and advantages of the present invention are described in, and will be apparent from, the detailed description of the presently preferred embodiments and from the drawings.

BRIEF DESCRIPTION OF THE DRAWINGS

FIG. 1 is a block diagram of an embodiment of the present invention showing the architecture of the software rental system.

FIG. 2 is a block diagram of an embodiment of the present invention showing the software components that are required to be installed in the customer's machine.

FIG. 3 is a flow chart of an embodiment of the present invention showing the operation of a random number generator used to generate nonces.

FIG. 4 is a block diagram of an embodiment of the present invention showing a rental software purchase scenario.

FIG. 5 is a block diagram of an embodiment of the present invention showing the smart card architecture.

FIG. 6 is a block diagram of an embodiment of the present invention showing an example audit trail.

DETAILED DESCRIPTION OF THE PRESENTLY PREFERRED EMBODIMENTS

An embodiment of the present invention will now be described by way of example with reference to the accompanying drawings.

FIG. 1 illustrates the architecture of a system 100. Potentially, multiple applications (programs) of software reside on the system 100 where each application has its own key file which is explained in detail later. FIG. 1 illustrates three applications, a word processor 104, a spread sheet 105, and another application 106 which access key files 101,102, 103, respectively. In some cases, multiple applications 104, 105,106 may share a common key file. Each of the applications 104,105,106 accesses its key file 101,102,103 to extract the customer's public keying material as described later in detail.

Each application vendor inserts rental instructions into a copy protected program. These rental instructions create log records, e.g. 109,110,111. For example, every fifteen minutes that the word processor 104 executes, the word processor 104 creates the following log record: "Word process WP with public key 9828a8c12a5873654bac684517d3afe3 executed for 15 minutes" (note that the record could store the message digest of the public keying material rather than the public keying material itself). Next, the application sends its log record to a rental server 107. The rental server 107 inserts the log record at the end of a secure audit trail 108 stored at a potentially unsecured storage location, e.g. a file on a disk. The rental server 107 relies on the assistance of a smart card for security.

An application, e.g. the applications 104, 105 or 106, may choose to create a log record that contains any arbitrary string of bits with arbitrary length. In addition, or in lieu of recording time, an application could potentially log the number of times that the application or some of its modules executes. For example, SS 105 could potentially append a single log record each time SS boots: "Application SS with public key 768230aac8239d9df88cf33c7b832a is executing." Different types of audit records, e.g. time of usage or number of times that usage occurred may appear in the same audit trail. Multiple rented applications may simultaneously use the same audit trail.

One obtains software rental by matching thresholds against the audit trail. FIG. 4 illustrates a customer 402 who rents software from a vendor 401. First, the customer 402 sends a request to rent the software to the vendor 401 in an order request 403. In this example, the customer 402 purchases six hours of the application 104. After receiving payment, the vendor 401 sends to the customer 402 a key file 404 that contains a usage authorization. In this case, the key file 404 permits six hours of execution by the application 104. The later described key file 404 may potentially contain other information, e.g. copy protection or licensing information.

Periodically, the rented application, e.g. word processor (application) 104, examines the audit trail 108. If the audit trail 108 is not valid, then word processor 104 does not permit itself to be rented. However, if the audit trail 108 is valid, then the application 104 analyzes the audit trail and compares the analysis against the key file 404. For example, the application 104 counts the number of log records that describe fifteen minute intervals. Next, the application 104 looks into the key file 404 to locate a rental threshold which, in this present example, is six hours (24×15 minute intervals). If the application 104 locates fewer than twenty-four of its log records denoting fifteen minute intervals, then the application 104 continues executing. Otherwise, the application 104 does not permit itself to be rented. In the latter case, the customer 402 must purchase a new key file in order to continue renting the application 104. If the application 104 were to exceed its rental threshold, then other applications, e.g. the spread sheet 105 and the other application 106 would not be effected. That is, each rented application views its own records from the audit trail without interpreting records created by other applications.

From the discussion above, the architecture implements software rental provided that the rented applications, e.g. the applications 104,105,106 can unequivocally validate the audit trail 108. The following properties should, therefore, be satisfied:

1. Holes: A rented application, e.g. the word processor 104, in this present example, validates that the audit trail contains all of the records that have ever been written regardless of application. If an application has previously written ten log records, then the rented application, e.g. the word processor 104, would not validate the audit trail if the rented application could not locate all ten log records. An absence of holes is required because an attacker should not be permitted to delete individual log records in order to destroy a record of usage.

2. Modification: An application, e.g. the word processor 104, must unequivocally conclude that no unauthorized attacker modified any of WP's log records. Otherwise, for example, the attacker could modify all of the fifteen minute log records to fifteen second log records to dramatically increase the amount of time that the software may execute.

3. Current: A rented application must be able to validate that the audit trail 108 is current. Otherwise, the audit trail 108 could potentially be old, thus hiding relatively new audit records 109,110 111. One would not wish, for example, an attacker to perform the backup and restore attack.

These three properties remove all incentive for an attacker to corrupt, delete, lose or otherwise abuse the audit trail 108. If the attacker were to render the audit trail 108 invalid, then all of the rented applications 104, 105, 106 would identify the abuse and subsequently refuse rental.

In order to provide security, the architecture requires a smart card 112 that performs asymmetric cryptography. In this present example, the smart card 112 executes digital signatures. The smart card 112 contains private keying material 501 and a counter 502 (see FIG. 5).

When the customer obtains the smart card 112, the smart card 112 is in a secure state. The smart card 112 provides exactly two services that access either the private keying material or the counter: SignAndIncrement( ) and GetCounter ( ), described in pseudo program code herein-after (note that the symbol // denotes a comment and ← denotes the assignment operator):

Signature SignAndIncrement(HASH h) // h is a message digest
BEGIN
   [1] Compute the message digest of h and the smart card's counter, i.e., h'← hash(h, counter)
   [2] Sign h' with the private keying material
   [3] Increment the smart card's counter by 1
   [4] Return the digital signature computed in step [2]
END
integer GetCounter( )
BEGIN
   [1] Return the current value of the smart card's counter
END Consider the following example trace. Suppose that the smart card's counter has an initial value of six and that one executes the following operations:

(i) Signature1←SignAndIncrement(hash("m1"))
(ii) Signature2←SignAndIncrement(hash("m2"))
(iii) int1 GetCounter( )

The results of this example are:

Signature 1 gets the digital signature (using the smart card's private keying material) of hash(hash ("m1"), 6)
Signature 2 gets the digital signature (using the smart card's private keying material) of hash (hash("m2"), 7)
int1 gets 8

The audit trail 108 contains a list of records where each record has four fields: nonce, string, counter, and signature. The data input into the signature is hash(hash(nonce,string), counter). FIG. 6 illustrates an example audit trail with four records. In the first record, the nonce has the value 96, the string is "WP 15 minutes public key 9828a8c12a5873654bac684517d3afe3" (where 9828a8c12a5873654bac684517d3afe3 denotes the message digest of a real public key), the counter's value is 0, and the digital signature is of hash (hash (96, "WP 15 minutes public key 9828a8c12a5873654bac684517d3afe3"), 0. Here, the digital signature was provided using the smart card's private keying material which corresponds to public keying material 9828a8c12a5873654bac684517d3afe3. This public keying material may be extracted from WP's key file.

The counter never rolls over from its highest value to zero. When the counter reaches its highest value, e.g., $2^{128}-1$, the system stops.

A rented application appends a record to the audit trail by executing the Write routine where the Write routine is embedded within the rented applications. This routine generates an audit record and then sends the audit record to the rental server 107. The rental server 107 writes the audit record into a non-volatile, stable image of the audit trail, e.g. on one or more files. The rental server 107 synchronizes access to the smart card 112 and the audit trail. The rental server 107 cannot execute in a manner that thwarts system security, i.e. the rented applications do not trust the rental server 107. If the rental server 107 were to act incorrectly, then there could potentially be a denial of service because it may be the case that the rented applications could not validate the audit trail.

The Write routine is provided below in pseudo program code:

Boolean Write(String str)
BEGIN
    [1] n→generate a new nonce
    [2] h2→hash(n,str)
    [3] s→SignAndIncrement (h1)
    // below, c is a local copy of value in the smart card
    [4] c←GetCounter( )
    [5] decrement c by 1
    [6] h2←hash(h1,c)
    [7] validate that s is the signature of h2 against the public key found in the key file (if the validation fails, then return failure immediately without executing any further steps; the key file will be described later in detail).
    [8] create the audit trail r←<n,str,c,s>
    [9] append r to the audit trail
    [10] return TRUE if all of the preceding steps succeed, otherwise return failure
END The ValidateTrail routine is also embedded in the rented application and should be executed periodically and is provided below in pseudo program code (assume that the system started with an initial counter value of zero):

Boolean ValidateTrail ( )
BEGIN
    [1] c←GetCounter( )
    [2] Write(c) // use the Write routine above, exit if // failure
    [3] r←Last record in the audit trail // this is the record that was just written in step [2]
    [4] Validate the signature stored in r against the public key stored in the keyfile
    [5] Validate that c is the same as the counter stored in r
    [6] FOR i←0 UNTIL there are no more records, INCREMENT i by 1
        [6.1] r←$i^{th}$ record from the audit trail
        [6.2] Validate the signature stored in r against the public key stored in the keyfile
        Signature validation comprises the message
        // digest recomputation
        [6.3] Validate that i is the same as the counter stored in r
    [7] END FOR LOOP
    [8] if all of the above steps succeed, then return TRUE, otherwise return FALSE
END In steps [4] and [6.2], all of the input for the validation is from the audit record itself. By carefully analyzing all of the steps in the Write and ValidateTrail routines, it is clear that any attack that thwarts the intended use of these routines causes failure. In this case, the rented applications notice the failure and do not permit themselves to be rented.

The mechanism for recovering from a failure depends upon the vendor for each particular rented application. The vendor may, for example, issue a new keyfile upon some customers' requests. Perhaps the most significant issue is recovery from accidental loss of the audit trail that may occur due to a disk error. In order to protect against this situation, the rental server 107 should be responsible for writing all records to the audit trail on behalf of all rented applications. The rental server 107 should maintain a primary audit trail on the local fixed disk and at least one backup audit trail on a separate medium, e.g. a floppy or a network file server. One may, for example, provide a service that permits the rental server 107 to e-mail audit trails to a secured network backup service. In this case, one can ensure privacy by permitting the rental server to encrypt the audit trail before transmission.

The term challenge means is used to denote the portion of a rented program that implements components of the present invention. The challenge means includes the implementation of the Write and ValidateTrail routines. In addition, the challenge means instructs the remainder of the program concerning how to operate depending upon the results of the Write and ValidateTrail routines. In addition, the challenge means interacts with the program's keyfile as described below.

The creation of the keyfile 404 is performed by a keyfile generator which is a program that executes at the vendor's facility. The vendor 401 must take care to guard this program.

In use of the keyfile generator, an operator enters the following information: Vendor name, i.e. name of the vendor's company; vendor password, i.e. password that unlocks the vendor company's private keying material (company employees who do not know the password cannot generate keyfiles); customer name which is distinguished from name of a customer for whom a keyfile is generated; (the name indexes into a database of public keying material); and Keyfile name, i.e. the name of a new keyfile.

After obtaining this information, the keyfile generator builds the keyfile 404, containing a customer information string (CIS) to be described later. Portions of the keyfile 404 appear to the customer 402 as a completely random sequence of values.

Building of the keyfile 404 involves the following operations: first, the keyfile generator creates a file and inserts the customer's public keying material into the file along with thousands of decoy bits. In the present example, each keyfile 404 contains approximately 480,000 decoy bits. This number of bits represents a significant amount of decoy material yet can fit into a standard e-mail message.

Each keyfile 404 stores the CIS in a different location. Additionally, each keyfile 404 has encrypted customer information embedded in it without disclosing the required encryption key. This encrypted customer information permits a vendor to easily identify the owner of a keyfile 404 in the event that the keyfile 404 appears in a public location, such as a bulletin board. The keyfile generator then encrypts and re-encrypts the keyfile (or portions of the keyfile) 705 multiple times using different algorithms. Finally, the keyfile generator signs the keyfile 404 using the vendor's private keying material by applying a digital signature algorithm.

A keyfile is said to be validated if the challenge means of the rented application (described below) can validate the vendor's signature using the public keying material stored in the challenge means' binary and access the decrypted CIS stored in the keyfile 404. After having created the keyfile 404, the vendor's computer sends the keyfile 404 to the customer 402 by electronic mail.

The CIS is a string that contains the customer's public keying material, the customer's access rights, and possibly a rental threshold. The access rights provide information to selectively enable functionality. For example, an access right may potentially authorize the program to execute the print function. A different access right could potentially permit the application to send audio information to he customer's speakers. Presumably, highly trusted customers, or customers who pay more money, obtain better access rights in their keyfiles. The keyfile 404 may have multiple uses, e.g. authorization for the application and rental information.

In the following, the operation of the rental mechanism is described in more detail. This is performed when the customer initially attempts to execute the rented program.

When the challenge mechanism 202 starts the process, the challenge 2020 (see FIG. 7) accesses the keyfile 404 associate with the rented application and calls a signature validation function 203 in the challenge mechanism 202 to validate the vendor's signature of the keyfile 404, using the vendor's public keying material 201 that is embedded in the challenge mechanism 202. This validation of the keyfile signature ensures that an attacker cannot modify the keyfile 404 or its digital signature without additionally modifying the challenge mechanism 202. The vendor 401 may optionally augment this protection using additional proprietary lines of defense. If the keyfile 404 has been modified, the challenge mechanism 202 hangs the rented program or otherwise disturbs normal program execution.

Assuming the signature of the keyfile 404 is validated, the challenge mechanism 202 then parses the keyfile 404 using a proprietary, vendor-specific algorithm to locate the customer's public keying material in the keyfile 404 and extracts the customer's public keying material. Subsequently, whenever required by the software rental mechanism, the challenge mechanism (challenge means) executes the software rental protocol as described earlier.

Generation of a nonce is performed by a nonce generator included in the challenge mechanism 202. Operation of the nonce generator is as follows and is shown in FIG. 3. First, the nonce generator queries a large number of system parameters, e.g. the system time, the amount of space remaining free in the page table, the number of logical disk drives, the names of the files in the operating system's directory, etc.

Next, the nonce generator builds a random number using a random number generator. The random number generator consists of two process threads referred to herein as Thread 1 and Thread 2. FIG. 5 shows the operation of Thread 1 which is the main thread of the random number generator.

(Box 301) Thread 1 first creates a data structure value_list for holding a list of counter values. The list is initially empty.

(Box 302) Thread 1 sets a current counter value to zero and sets a done_test flag to FALSE.

(Box 303) Thread 1 then forks Thread 2. Thread 2 posts an asynchronous disk access, and then sleeps until the disk access is complete. When the disk access is complete, Thread 2 sets the done_test flag to TRUE. Note that Thread 1 and Thread 2 share the done-test flag.

(Box 304) Thread 1 increments the counter value by one.

(Box 305).Thread 1 then tests whether the done_test flag is now TRUE, indicating that the disk access initiated by Thread 2 is complete. If done-test flag is FALSE, the thread returns to box 54. Thus, it can be seen that while waiting for the disk access to complete, Thread 1 continually increments the counter value.

(Box 306) When done-test flag is TRUE, Thread 1 terminates Thread 2 and saves the counter value in the first free location in value-list.

(Box 307) Thread 1 then calls a Statstest function which estimates the degree of randomness of the counter values (or portions of counter values, e.g., low-order bits) saved in value_list. This function may use the Chi-Square Test, the Kolmogorov-Smirnov Test, or the Serial Correlation Test, which are described in D. Knuth, supra. The Statstest function may be optimized to ensure that complicated calculations are not repeated for each disk access. The Statstest function returns a value which indicates how any low-order bits of each saved counter value should be considered random.

(Box 308) Thread 1 compares the value returned by the Statstest function when combined with the length of the value_list with a predetermined threshold value to determine whether enough random bits have now been generated. If not enough random bits have been generated, the process returns the box 302 above so as to generate and save another counter value.

(Box 309) When the required number of random bits have been generated, Thread 1 extracts the specified number of low-order bits from each counter value in the value_list and returns this sequence of bits as the output random number.

In summary, it can be seen that the random number generator exploits the unpredictability in the timing of a series of disk accesses as a source of randomness in the generation of nonces. By forking new threads on each disk access, the random number generator also exploits unpredictabilities in the operation of the operating system's scheduler as a second source of randomness.

The analysis performed by the Statsfest function permits the random number generator to self-tune for any speed processor and disk by computing the number of low-order bits of each saved counter value to return. For example, a system with a high-variance disk access time generates more random bits per disk access that a system with a low-variance disk access time. For example, for a Quantum 1080s disk (6 ms average write time), and a 486 66 MHz processor, the system generates approximately 45 bits per second. Alternatively, one may hard code the number of bits per disk access and use a de-skewing technique to ensure a good degree of randomness.

The nonce generator also queries the operating system to ensure that it posts each disk access to an actual disk. The final output nonce is formed by combining the output random number from the random number generator with the result of querying the system parameters as described above using a message digest.

The nonce generator described above works best when executing on an operating system that provides direct access to the disk, e.g. Windows 95 or Windows NT 4.0. In such an operating system, special operating system calls available to programs executing in customer space permit a program to bypass the operating system's internal buffering mechanism and write directly to the disk. Most programs do not take advantage of these special operating system calls because they may be relatively inefficient and difficult to use. On Windows 95 and Window NT, a program may only use these special calls if the program accesses data that is a multiple of the disk's sector size by querying the operating system.

If the operating system does not provide direct access to the disk, then the challenge mechanism 24 could still use the disk timing random number generator. However, in this case, the quality of the generated values would have a greater reliance upon unpredictabilities in the operating system's scheduler as opposed to the variance inherent to the disk access time.

The example of the present invention as described above assumes that the operating system permits a program to fork multiple threads within a single address space. Additionally, the example of the present invention assumes that the operating system permits the threads to access synchronization variables such as semaphores. Most modern operating systems provide these services. The example of the present invention uses multiple threads to implement a mechanism which quantifies each disk access time. However, if an implementation of the present invention were to execute on a system that does not provide multiple threads or synchronization variables, then the nonce generator may substitute other mechanisms, e.g. querying a physical clock.

In order to improve performance, one may augment the system with a trusted audit trail validation service. Here, the trusted service periodically validates an audit trail and then appends a new audit record, the validator record, that securely vouches for the previous records. Example information that the validator record may contain is a digital signature of the hash of all preceding audit records in the audit trail (the digital signature uses the private key of the audit validation service). Henceforth, rented applications need not validate digital signatures of records that preceded the validator record. The audit trail validation service may be implemented by a third party that is accessible via a network or e-mail connection.

In the ValidateTrail procedure's steps [5] and [6.3], it is possible that the counter value of the initial record is not zero. In this case, the counter value starts at offset, and steps [5] and [6.3] must take offset into account in the comparison.

Note that the vendor of the rented application trusts the smart card to avoid releasing the private keying material. Aadditionally, the vendor of the rented application trusts that the smart card uses its private keying material in no functions other than SignAndIncrement and GetCounter. The vendor of the rented application may wish to validate the smart card manufacturer and/or personalizer.

A vendor may create and distribute an application after a customer obtains a smart card. In this case, the vendor simply creates a software rental keyfile for the customer and sends the keyfile to the customer (possibly after receiving payment).

In a variant to the example mechanism, all customers rent the software using the same public/private key pair. Here, the vendor trusts that the smart card operates correctly and never releases the value of the private keying material outside of the smart card. As in the case of FIG. 5, the smart card contains both private keying material 501 and a counter 502. Additionally, the smart card contains a unique serial number where no two smart cards have the same serial number. Step [1] of the SignAndIncrement routine implemented on the smart card differs from the one described above as follows:

[1] Compute the message digest of h and the serial number and the smart card's counter, i.e., h'← hash(h, serial_number, counter).

In addition to the SignAndIncrement and the GetCounter routines, the smart card additionally provides the GetSerialNumber routine:

string GetSerialNumber( )
BEGIN
    [1] return the smart card's serial number
END The customer additionally sends his or her smart card's serial number. The keyfile 404 contains the following information:

The universal public keying material potentially shared by all customers

The unique serial number of the customer's smart card
The hash records stored in the log file take into account the serial number. For example, the first hash record of FIG. 6 has the following information for a message signature:

Signature of hash(hash(96,WP . . . ), serial_number, 0)
The Write routine step [6] has the following modification:

[6] h2←hash(h1,serial_number,c)
The ValidateTrail routine's steps [4] and [6.2] must use the serial number (otherwise they always fail). The vehicle that the Write and ValidateTrail routines use is not specified to obtain the serial number of the local smart card. One may, for example, query the smart card a single time and then store the serial number in a file in the local file system.

A software vendor may potentially provide a rented application with a complex threshold calculation. For example, the vendor may rent blocks of 1000 units. For each hour that the software executes between 20.00 (8:00 PM) and 06.00 (6:00 AM) the next morning, the log record defines one unit; and for each hour in a different portion of the day, the log record defines two units. So, for example, a customer may potentially use the software for 1000 nighttime hours, 500 daytime hours, or some calculated combination of nighttime and daytime hours.

Alternatively, a threshold may be calculated using a Boolean combination of multiple parameters. A software vendor may potentially provide a rental application with no threshold. Every month, the software vendor obtains the current value of the SUSL and gets the audit trail. The vendor then validates the audit trail and charges a fee accordingly. If the customer does not wish to continue renting the software, then the vendor asks to have the smart card returned. It is very easy to query the value of the SUSL if the customer briefly returns the smart card to the vendor. Otherwise, the vendor accesses the smart card via a network interface. First, the vendor generates a random nonce and asks the customer to use Write(nonce) to append the nonce to the audit trail. Next, the vendor executes the ValidateTrail routine remotely. This service requires the customer (or programs that operate on the customer's behalf) to relay the vendor's requests from the network to the smart card. The vendor then checks the validate audit trail for the nonce.

The software rental mechanism may be augmented with an additional software copy protection mechanism. The software copy protection mechanism ensures that only the authorized customer may rent the program. The software copy protection mechanism may potentially share a keyfile with the software rental mechanism. Any of the rental mechanisms described in this document may also be used for renting documents as opposed to software. The approach is to rent a viewer program which uses a file.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for renting software having at least one rented program and private keying material, the method comprising the steps of:

securely storing audit trails in the software rental system;

validating the correctness of said audit trails using asymmetric cryptography, and providing a keyfile for holding public keying material, said public keying material held in said keyfile being cryptographically secured wherein it is computationally infeasible to alter any portion of the keyfile including said public keying material without altering the challenge means.

2. The method according to claim 1 wherein said at least one rented program has no access to the private keying material.

3. The method according to claim 1 wherein the audit trails include the extent to which the rented program has been rented.

4. The method according to claim 1 wherein validation ensures that no audit trail has been modified, that no audit trail has been deleted, and that the list of all audit trails is up to date.

* * * * *